United States Patent [19]

Weiss

[11] Patent Number: 4,844,622
[45] Date of Patent: Jul. 4, 1989

[54] RESETTABLE REUSABLE TIME TEMPERATURE RECORDING THERMOMETER

[76] Inventor: Ira Weiss, 16 Harding St., Albany, N.Y. 12208

[21] Appl. No.: 223,526

[22] Filed: Jul. 25, 1988

[51] Int. Cl.[4] .............................................. G01K 3/04
[52] U.S. Cl. .................................... 374/102; 374/107; 374/186; 368/327
[58] Field of Search ...................... 374/102, 107, 186; 368/89, 93, 327; 73/427

[56] References Cited

U.S. PATENT DOCUMENTS

| | | | |
|---|---|---|---|
| 3,175,401 | 3/1965 | Gelomacher | 73/358 |
| 3,242,733 | 3/1966 | Johnson | 374/102 |
| 3,859,856 | 1/1975 | Keele et al. | 73/356 |
| 3,878,722 | 4/1975 | Crites | 73/356 |
| 4,028,944 | 6/1977 | Erb | 73/356 |
| 4,488,822 | 12/1984 | Brennan | 374/102 |

Primary Examiner—William A. Cuchlinski, Jr.
Assistant Examiner—Diego F. F. Gutierrez
Attorney, Agent, or Firm—Schmeiser, Morelle & Watts

[57] ABSTRACT

This instrument for tracking and recording temperature excursions in commerical refrigeration environments comprises a closed vessel having two chambers and metering orifice therebetween and a time measurement and recording means including a scale to indicate the total time duration of liquid flow through the orifice from one chamber to the other; and as an assembly of such vessels with fill liquids of different freezing point tempertures this instrument has relatively broad temperature range monitoring capability.

8 Claims, 2 Drawing Sheets

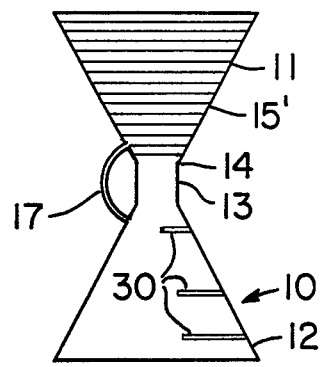
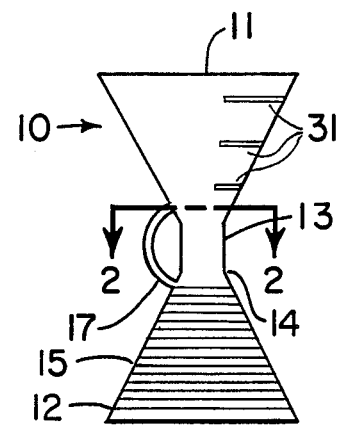
FIG. 1a          FIG. 1b
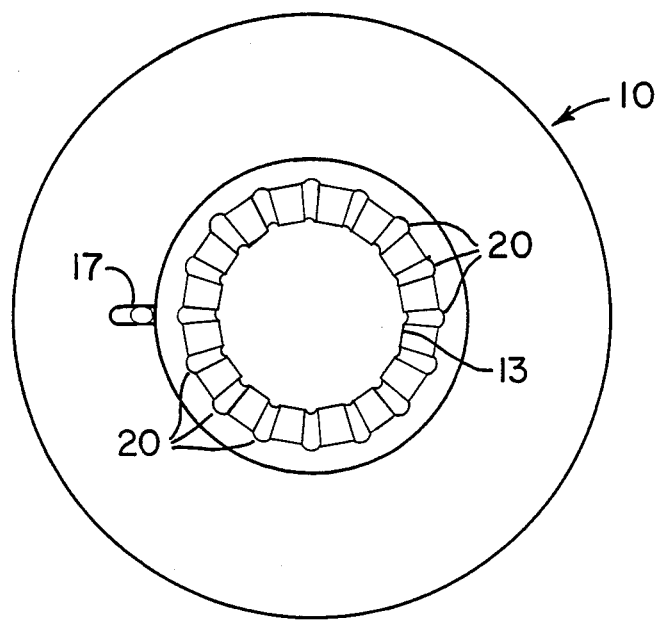
FIG. 2

RESETTABLE REUSABLE TIME TEMPERATURE RECORDING THERMOMETER

FIELD OF THE INVENTION

The present invention relates generally to the time-temperature monitoring art, and is more particularly concerned with a novel resettable, reusable, time-temperature recording thermometer having special utility in monitoring commercial refrigeration.

BACKGROUND OF THE INVENTION

Modern commercial refrigeration systems include means for detection of malfunction which could be detrimental to stored commodities. Thus it has long been generally recognized that there is an important ever-present risk of spoilage of foods, pharmaceuticals, biological products or other chemical materials due to unattended elevated temperatures of extended duration. Prior art instruments intended to meet that need have taken a variety of forms. One type, which is not reusable, detects warm up above a preselected temperature and records the duration of the warm up period. Another type is reusable and records the maximum temperature, but does not indicate the length of time at temperature. Moreover, none of the prior art devices is capable of indicating either variations in the rate of warm up or the length of time at intermediate temperature in the warm up temperature range. From the standpoint of waste prevention and needless discard of refrigerated materials such data and information would obviously be very desirable.

SUMMARY OF THE INVENTION

By virtue of my present invention, based upon the new concepts and discoveries set forth below, a temperature tracker of unique capabilities and consequent special utility is provided. Further, this device which is unlimitedly resettable and reusable, has an extremely long service life, is shock resistant and maintenance free and never requires recalibration. This device is also inexpensive to manufacture, requires very limited space and is easily understood and readily used. Additional features offered by this invention include the options of tamper-proof construction and tailoring for special time-temperature monitoring purposes.

A principal concept of this invention is represented by the combination of a flow-metering orifice between two separate chambers of approximately equal volume of a vessel containing a fill material of predetermined solid-liquid transition point temperature. As a related concept, elapsed time measurement and recording means is provided to indicate duration of liquid flow through the metering orifice of the transparent vessel positioned in a refrigeration environment of concern.

According to another new concept of importance, a time-temperature monitoring assembly is provided in the form of an array of such novel vessels, each of which contains a fill material of different solid-liquid transition point temperature from the others so that a continuous temperature range is covered over an unbroken time interval. The assembly includes a mounting board to which the individual vessels of the array are secured and also carries time scales to indicate the length of time of liquid dwell in each of the vessels of the array.

It will be understood from the foregoing that the fill in each vessel is provided in amount such that in solid form the volume of the fill is preferably approximately, but slightly less than, that of one of the vessel chambers. Also, in use the vessel is disposed with the chamber containing the fill in solid form above the empty chamber so that on melting, the fill flows by gravity into the lower chamber at a rate controlled by the metering orifice.

Briefly described, a time-temperature recording thermometer of this invention comprises a closed vessel having two separate chambers with a metering orifice between them to limit the rate of liquid flow from one of the chambers to the other. There is an elapsed time measurement recording means including a scale associated with the vessel to indicate the time duration of liquid flow through the metering orifice. In condition ready for use the vessel is sealed with frozen fill material of selected melting point temperature, substantially one of the two chambers while the other is empty.

The time-temperature monitor assembly of this invention, likewise described generally, comprises an array of a plurality of vessels of this invention, each of which has two separate chambers and a metering orifice between them for the purpose indicated above and one chamber of each vessel is full of fill material of selected melting point temperature different from that of every other fill material of the other vessels of the array. Elapsed time measurement and recording means including a time scale is associated with the vessel array to indicate the time durations of liquid flows through the metering orifices of the several vessels of the instrument and to indicate the duration of liquid phase periods of the fill materials and the rate of rise of temperature in the monitored environment.

BRIEF DESCRIPTION OF THE DRAWINGS

Those skilled in the art will gain a further and better understanding of this invention upon consideration of the drawings accompanying and forming a part of this specification, in which:

FIG. 1A is an elevational view of a time-temperature recording therometer of this invention;

FIG. 1B is a similar view of the FIG. 1 instrument showing the fill material in the intermediate stage of migration to the lower chamber;

FIG. 2 is a transverse sectional view of the instrument of FIG. 1B taken on line 2—2 thereof with the fill material removed.

DETAILED DESCRIPTION OF THE INVENTION

Figure 3:
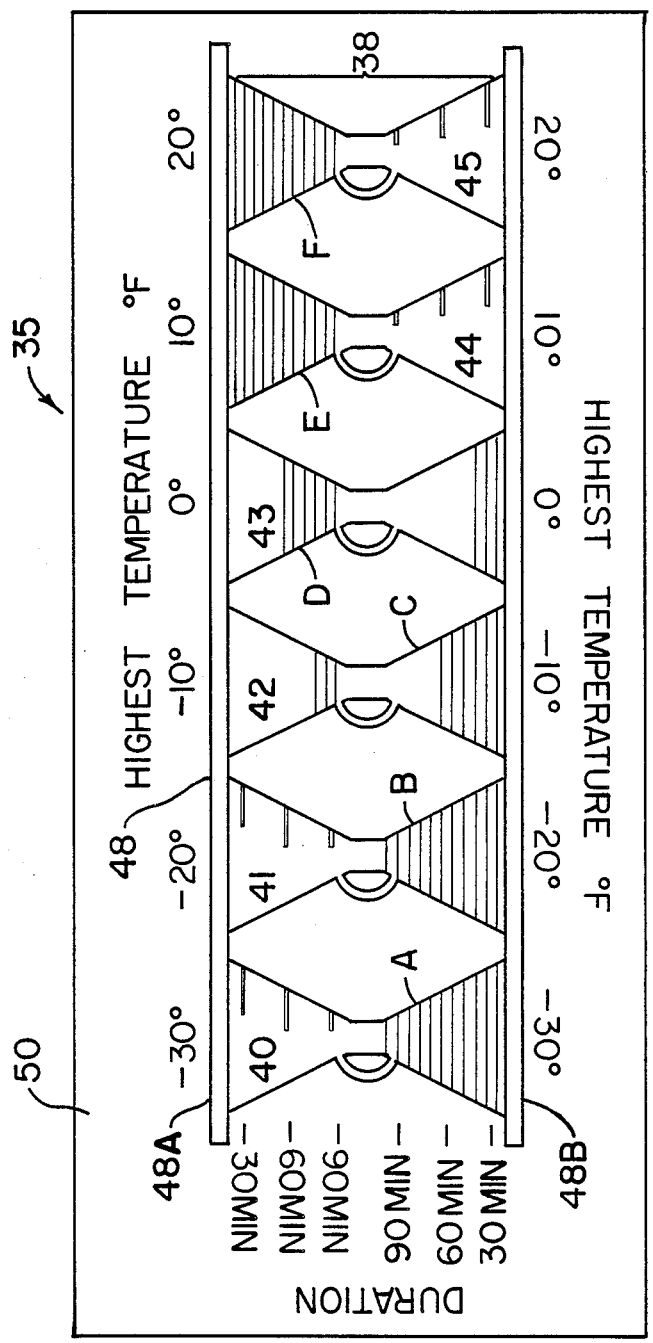
FIG. 3 is a view in elevation of a monitor assembly of this invention.

The preferred embodiment of this invention illustrated in the drawings comprises a clear or transparent vessel 10 having two chambers 11 and 12 and a metering orifice therebetween. Vessel 10 is of generally hourglass shape and chambers 11 and 12 are consequently of approximately the same volume and metering orifice 13 is in effect a throat in neck 14 of the vessel 10. As shown, the vessel contains a fill material 15 of selected melting point temperature in volume substantially equal to that of one of the chambers 11 and 12 and vessel 10 is sealed against leakage of the fill material in whatever position or attitude the vessel is situated.

A tube 17 exterior of the vessel 10 bridges the neck 14 communicating at its ends with chambers 11 and 12 for gas pressure equalization as liquid flows from one chamber to the other through metering orifice 13.

As shown in FIG. 2, a number of axially extending shallow channels or grooves 20 are formed in the inner surface of neck 14 of vessel 10, runnning from one chamber to the other through metering orifice 13. The function of this feature is to promote liquid flow from chamber to chamber which might otherwise be impeded by the presence of unmelted fill in the vessel neck region and the surface tension of the liquid fill material.

Vessel 10 may be made of any of a wide variety of translucent or transparent materials such as glasses and plastics suitable for long term service in environments of intended use and not detrimentally effected by the fill materials of choice. My present preference is commercially-available polycarbonate resin plastic marketed by General Electric Company under the registered trademark LEXAN.

The fill material is likewise largely a matter of the operator's choice, there being a wide variety of organic and inorganic materials having requisite sharp melting point temperatures. My preference at this time, however, is ethylene glycol diluted with water to the extent necessary to meet the desired melting point temperature for the monitoring purpose of the instrument. Also a dye material which is not reactive with either the fill material or the material of construction of the vessel is incorporated in the fill material to enhance readability of the instrument and prevent erroneous interpretations in the use of the instrument.

The elapsed time measurement recording means of the instrument of this invention includes two sets of fill level indicia 30 and 31 marked on the vessel walls defining chambers 12 and 11. These axailly-spaced horizontal lines are preferably etched in the outside surface of the vessel 10 and spaced at regular intervals in each set to designate accurately the time duration of liquid flow into each chamber, and consequently the total length of time that the temperature in the monitored environment was above the melting point temperature of the fill material of that particular vessel.

Time-temperature monitor assembly 35 shown in FIG. 3 as a preferred embodiment of this invention comprises an array 38 of six vessels 40–45 mounted side-by-side in bracket 48 carried by a mounting board 50. Vessels 40–45 are identical to vessel 10 in size, shape and structure. Fill materials A–F in vessels 40–45 have melting point temperatures of −30, −20, −10, 0, +10, +20 degrees F, respectively, designated "Highest Temperature °F" on board 50 above and below bracket 48. As described above, these fill materials are preferably all of ethylene glycol to which water has been added in amounts required to establish the various desired melting point temperatures. As those skilled in the art will understand, such additions can readily be made with precision by titration and any of a wide variety of liquids may be used as alternatives to water for the purpose. If desired, however, solids which are soluble in ethylene glycol or other equivalent material may be used. The operator has also a wide choice in regard to dye additions to the fill and may use no dye or may even use a variety of dyes to provide a color spectrum display of the vessel array.

Additional legends are displayed on mounting board 50 carrying bracket 48 and the vessel array to facilitate readout of temperature excursions during time-temperature monitoring period. Thus at one end of the vessel array 38 the duration of dwell at temperature for the six different melting point temperatures of fill material of vessels 40–45 is indicated in increments of 30, 60 and 90 minutes for each of the two attitudes of assembly 35.

In producing assembly 35, one chamber of each vessel 40–45 is filled with liquid of the requisite melting point temperature at the position of that vessel on mounting board 50. Each vessel is then permanently sealed against leakage of fill material and secured in place in bracket 48. With the filled vessels in position side-by-side and locked against relative motion in the bracket, the vessel array is hung on mounting board 50 with the individual vessels in register with the appropriate temperature designation on the board.

In use, monitor assembly 35 is first refrigerated so that the fill material in every vessel is frozen. Then the assembly is inverted so that the solidified fill materials are all in the top chambers of vessels 40-45 and the instrument is displayed in that position in the freezer environment to be monitored. At a predetermined time or when the user observes that the fill material has migrated to the lower chamber of one or more of vessels 40-45, the monitor is read to determine the highest temperature reached during the monitoring period and also the duration of time at that temperature, as well as the rate of rise of the monitored environment temperature. This involves reading the vessels in which such fill material migration has occurred and also observing the volume of that migration.

An example of use of this monitoring instrument is illustrated in FIG. 3, it being recognized that in the initial set position fill materials A–F were all at the top level, that is, the upper chamber of each vessel was filled with frozen fill material and the lower chamber was empty. The monitor has thus recorded that a temperature of −30 degrees F prevailed for at least 90 minutes and a temperature of −20 degrees F also prevailed for at least 90 minutes. Further, the instrument shows that the temperature of −10 F. was experienced for only 60 minutes and 0 degrees F. lasted for only 30 minutes. Finally, the recorder shows that the temperature did not rise to +1 degrees F. at any time during the monitoring interval.

To reset the instrument for reuse in a similar manner, it is necessary only to melt the fill materials in all vessels and drain them into the lower chambers of vessels and then to refreeze the fill materials in that position before inverting the assembly and placing it in the refrigerated environment to be monitored thereby.

In regard to structural details and method of construction of the monitor assembly of FIG. 3 in terms of the "best mode" presently contemplated, vessels 40–45 are first filled with the six different requisite ethylene glycol-water solutions, as described above, and then closed and liquid-tightly sealed. Then the vessels are mounted upright in two-piece wooden bracket 48 consisting of a lower panel 48A and an upper panel 48B, being attached top and bottom to those bracket parts by adhesive means, preferably the commercially-available cyanoacrylate adhesive for use on wood which is marketed by Krazy Glue Inc., Itasca, Ill. as Special Formula Krazy Glue for wood and leather.

Bracket 48 with vessels 40–45 secured in side-by-side array, as illustrated in FIG. 3, is then attached to wooden mounting board 50, adhesive means again being the choice for the purpose. The above-identified commercially-available cyanoacrylate adhesive is used, being applied to panels 48A and 48B along the edges thereof appeased to the mounting board surface. In attaching the bracket to the mounting board, care should be taken to see that the vessel array is aligned with the time indicia and in register with the temperature indicia carried on board 50.

Further, in regard to the specifics as to vessel 10, those skilled in the art will recognize that the drawings are not to scale, particularly as to the size of metering orifice 13. Thus for purposes of illustration, the cross-sectional size of orifice 13 is relatively small compared to the average cross section chambers 11 and 12. Actually, the orifice size is matched to the volume of the chambers so that the time required to drain all the liquid from a completely filled chamber into the other initially empty chamber is about 90 minutes. Consequently, the user has a wide latitude of choice as to the size of vessel 10 and therefore the overall size of the instrument of this invention that is the time-temperature monitor assembly of FIG. 3.

What is claimed is:

1. A sealed time-temperature recording therometer resettable and reusable in original sealed condition for tracking temperature rise and registering indication of time at temperature between minimal initial and preselected maximal temperature comprising:
   (a) a closed vessel having two separate chambers,
   (b) a fill material of selected liquid-solid transition point temperature partially filling the vessel;
   (c) a metering orifice between the two chambers of the vessel to limit the rate of liquid flow from one of said chambers to the other; and;
   (d) elapsed time measurement and recording means including a scale associated with the vessel to indicate the time duration of liquid flow through the metering orifice.

2. A thermometer of claim 1 in which the vessel is an elongated article of transparent material and elapsed time measurement and recording means comprises axially-spaced fill level indicia on the vessel wall.

3. A thermometer of claim 2 in which the chambers are at each end of the vessel and in which the recording means indicia comprise two separate sets of axially-spaced fill level marks on walls defining the vessel chambers.

4. A thermometer of claim 1 in which the chambers are of substantially equal volume and the volume of fill material in the solid state is substantially one half the total chamber volume of the vessel.

5. A thermometer of claim 1 including gas pressure equalizing means comprising a tube connected to the vessel and communicating with the vessel chambers for flow of gas displaced from one of the chambers as fill material flows through the orifice from the other chamber.

6. A time-temperature monitor assembly comprising an array of a plurality of closed vessels each of which has two separate chambers and a metering orifice between them to limit the rate of liquid flow from one of the chambers to the other of fill materials of various different liquid-solid transition point temperatures, elapsed time measurement and recording means including a time scale associated with the vessel array to indicate the time durations of liquid flows through the metering orifices of the several vessels of the array and the duration of liquid phase periods of fill materials and the maximum rate of rise of temperature in the monitored environment.

7. The assembly of claim 6 including a mounting board on which the vessel array is secured and carried and on which the liquid-solid transition point temperatures of the several different fill materials are marked adjacent to the position on the board of the vessel containing the sole designated fill material in each instance.

8. A sealed resettable and reusable time-temperature recording thermometer for tracking temperature rise and registering indication of time at temperature between minimal initial and preselected maximal temperature comprising:
   (a) an elongated closed vessel of transparent material having a chamber at each end;
   (b) a fill material of selected liquid-solid transition point temperature partially filling the vessel;
   (c) a metering orifice between the chambers at the ends of the vessel to limit the rate of liquid flow from one of said chambers to the other; and,
   (d) elapsed time measurement and recording means comprising axially - spaced fill level marks on walls defining the vessel chambers.

* * * * *